United States Patent
Teunissen (10) Patent No.: US 7,095,948 B2
(45) Date of Patent: Aug. 22, 2006

(54) METHOD OF STORING DIGITAL AUDIO AND/OR VIDEO PROGRAMS COMPRESSED ON THE BASIS OF GROUPS OF PICTURES (GOPS) ON A MEDIUM WITH IMMEDIATE JUMPING BETWEEN GROUPS THROUGH CO-STORAGE OF TRANSPORT STREAM PACKETS AND POINTER INFORMATION, A METHOD FOR READING SUCH INFORMATION, AND A DEVICE FOR STORING AND/OR READING SUCH INFORMATION

(75) Inventor: Cornelis Teunissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 512 days.

(21) Appl. No.: 10/300,397

(22) Filed: Nov. 20, 2002

(65) Prior Publication Data

US 2003/0072564 A1    Apr. 17, 2003

Related U.S. Application Data

(63) Continuation of application No. 09/307,159, filed on May 7, 1999, now Pat. No. 6,512,882.

(30) Foreign Application Priority Data

May 8, 1998    (EP)    ................................. 98201509

(51) Int. Cl.
*H04N 5/91*    (2006.01)

(52) U.S. Cl. ............................ 386/68; 386/70; 386/83; 386/95

(58) Field of Classification Search ................. 386/68, 386/70, 95, 125, 83; 6/11
See application file for complete search history.

(56) References Cited

U.S. PATENT DOCUMENTS

| | | | | |
|---|---|---|---|---|
| 5,455,684 A | * | 10/1995 | Fujinami et al. | 386/111 |
| 5,535,008 A | | 7/1996 | Yamahishi et al. | 386/109 |
| 5,596,564 A | | 1/1997 | Fukushima et al. | 386/125 |
| 5,619,337 A | | 4/1997 | Naimpally | 386/83 |
| 5,684,773 A | | 11/1997 | Hayashi | 369/59 |
| 5,701,386 A | | 12/1997 | Yoneyama | 386/909 |
| 5,771,330 A | * | 6/1998 | Takano et al. | 386/52 |
| 5,909,257 A | | 6/1999 | Ohishi et al. | 348/726 |
| 6,160,954 A | | 12/2000 | Ogawa | 386/111 |
| 6,169,843 B1 | | 1/2001 | Lenihan et al. | 386/46 |

FOREIGN PATENT DOCUMENTS

EP    0676595 A2    10/1995

(Continued)

*Primary Examiner*—Vincent Boccio
(74) *Attorney, Agent, or Firm*—Michael E Belk (57) ABSTRACT

A method for storing digital audio and/or video programs compressed on the basis of groups of pictures (GOPs) on a medium with immediate jumping between groups through co-storage of Transport Stream packets and pointer information, a method for reading such information, and a device for storing and/or reading such information.

Digital audio and/or video programs that have been compressed on the basis of groups of pictures (GOPs) are recorded on a medium that allows immediate jumping between groups through co-storage of Transport Stream packets and pointer information. In particular, coexistently with the storing, successive pointers are derived in realtime from a primary Transport Stream that collectively point to data packets in a reconstructed Transport Stream which contains entry points. These pointers are stored at predetermined locations on the medium.

25 Claims, 4 Drawing Sheets

| FOREIGN PATENT DOCUMENTS | | | WO | WO9407332 | 3/1994 |
|---|---|---|---|---|---|
| EP | 0712256 A2 | 5/1996 | | | |
| EP | 0910087 A2 | 4/1999 | * cited by examiner | | |

METHOD OF STORING DIGITAL AUDIO AND/OR VIDEO PROGRAMS COMPRESSED ON THE BASIS OF GROUPS OF PICTURES (GOPS) ON A MEDIUM WITH IMMEDIATE JUMPING BETWEEN GROUPS THROUGH CO-STORAGE OF TRANSPORT STREAM PACKETS AND POINTER INFORMATION, A METHOD FOR READING SUCH INFORMATION, AND A DEVICE FOR STORING AND/OR READING SUCH INFORMATION

CROSS REFERENCE TO RELATED APPLICATIONS

This is a continuation of application Ser. No. 09/307,159, filed May 7, 1999 now U.S. Pat. No. 6,512,882.

A method for storing digital audio and/or video programs compressed on the basis of groups of pictures (GOPs) on a medium with immediate jumping between groups through co-storage of Transport Stream packets and pointer information, a method for reading such information, and a device for storing and/or reading such information.

BACKGROUND OF THE INVENTION

The invention relates to a method as recited in the preamble of claim 1. Classical video recording allows trick modes such as fast forward and fast reverse. Trick modes have become more complex to implement for digital video that is compressed on the basis of groups of pictures (GOP), because uniform video intervals may correspond to data packet sequences of non-uniform lengths, depending on the information content of the video. U.S. Pat. No. 5,701,386 allows fast forward and fast reverse by providing each Group of Pictures with a GOP header and each sequence of GOPs with sequence headers both before its first GOP and also before its last GOP. Hereinafter, the term "picture" will be used consistently. Depending on the actual video standard, the term "picture" may include "frame" as well as "field". However, modern digital broadcast, in particular via satellite, uses Transport Streams (TS) according to system layer standard ISO/IEC 13818-1 for transmitting multi-channel audio and/or video. The video layer standard may be H262 or ISO/IEC 13818-2, the audio layer standard ISO/IEC 13818-3. These features are used inter alia for DVB and are intended for linear play without feedback from a decoder. Packets arrive at a receiver one by one and their assignment to a particular program is generally not known, before the packet itself will have arrived: indeed, assignment is through PSI-tables. For storage, one or more specific programs are selected from a received Transport Stream. This will necessitate either at storing time or at replay time the adapting of certain stream parameters for retaining a valid Transport Stream for replay.

Replay systems will generally support jumping over a selectable physical storage distance, but the probability of then hitting an entry point to the actually stored program is low. The finding of such entry points will necessitate repeated and time intensive searches, which may cause buffer underflow. It also becomes nearly impossible to replay the stream at an n times higher speed with n integer, as well as to land immediately on a video fragment that may be played independently. Therefore, if storage takes place on a dedicated apparatus, the locations of the entry points must be immediately known, either directly, or via pointers. The problem becomes more severe if a plurality of program must be stored.

SUMMARY TO THE INVENTION

In consequence, amongst other things, it is an object of the present invention to format stored video in such manner that various trick modes will become feasible for a Transport Stream environment, whilst maintaining the data handling facilities proper to this environment.

Now therefore, according to one of its aspects the invention is relates to a method for replaying such recorded Transport Stream and to a device arranged for practicing the invention. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

STRUCTURAL DESCRIPTION OF A RELEVANT ENVIRONMENT

According to their agreed upon format, Transport Stream Packets start with a Transport Stream packet header, which contains a Packet IDentifier PID. Through the Program Specific Information PSI tables, the data content in a TS packet will be known. The PID for the video data V_PID of each transmitted program is stored in the PSI tables in the Transport Stream. A variable payload_unit_start_indicator pusi is stored in the Transport Stream packet header and indicates whether the payload of the packet in question starts indeed with the first byte of a Packetized Elementary Stream PES packet (ISO/IEC standards supra). Finally, the adaptation_field_control (afc) indicates whether the Transport Stream packet contains indeed an adaptation field and/or a payload.

To set a pointer, the system usually only needs to access packets that have PID=V_PID, pusi=1 and an afc that is either equal to 1 or equal to 3. If the table would be too long for a single 188 byte packet, two or more contiguous packets with PID=V_PID must be accessed. Only packets so signalled need be checked for presence of an entry point. Entry points may be as follows:
a TS packet with the start of an I-picture;
a TS packet with the start of a GOP;
a TS packet with the start of a sequence header.

The pointers may be transiently stored in RAM memory and eventually written to disc. A program with a video take length of 135 minutes with 25 pictures per second, a 12-picture GOP size and a pointer length of 4 bytes, will produce about 0.54 Mbit or 67 kbyte pointer information. At a 16 Mbaud transfer speed, writing all pointers this will need about 35 millisecs, provided they get a separate disc area. If RAM is too small, the pointers must be written earlier. The pointers may be kept within the stored stream, such as by storing them when reaching a certain number such as 1000 selected packets. At replay, pointer positions will then be known immediately. Alternatively, a table of pointer locations may be used. If the pointers are kept on a separate location, they may be written either after a certain time interval, or at instants when actual bitrate is low, or anyway before reaching buffer storage capacity.

The following further information may be stored with the pointers to facilitate the replay of a stored program:

the length in seconds of the video at recording time to calculating the remaining time;

size of the GOPs, and if applicable, the characterization of the GOPs as being closed or non-closed, such as according to MPEG-standard, and whether their sizes are uniform or not;

the PID of packets containing the Program Map Table PMT;

the PID of packets storing the Program Clock Reference PCR;

the PID of packets with video information;

Start Time Code that may be used to calculate elapsed time;

Frame Rate that in combination with a uniform GOP size may be used to jump to a particular instant in time;

the total number of TS packages which may be used to calculate the end of the program in question;

the overall numbers of I-, B- and P-pictures;

the total number of I-pictures;

average bitrate.

The use of Pointers may support replaying of a particular program at higher speed. Transport Stream conditions should be maintained by avoiding referencing non-existent pictures. Further, certain fields may have to be adapted.

Trick play is facilitated by forwarding to a decoder only TS packets that contain video information, inclusive of SI information and PCR packets. Faster play of sound is generally not useful. The storing of extra information will allow to select for forwarding exclusively those packets that have a PID corresponding to that of PAT, PMT, PCR, and V_PID. The GOP size information may be used for in a "non-closed" GOP environment, during replay of complete GOP's, selectably bypassing a particular B-picture, and possibly to adapt temporal references in other packages. The video duration at recording time may be used, in combination with the time code stored in the GOP header to calculate and display elapsed time. The combination of frame rate and a fixed GOP size allows to periodically replay exactly a specified number of seconds, and to subsequently jump n times the earlier number, where n may have values such as in the range 1–100. An extra advantage of pointer-supported storage is that a program need to be stored only once. The described organization supports the recording of a plurality of programs in parallel in the secondary Transport Stream in an interleaved manner. In that case, each program will need its associated array of pointers.

DETAILED DESCRIPTION OF PREFERRED EMBODIMENTS

Figure 1:
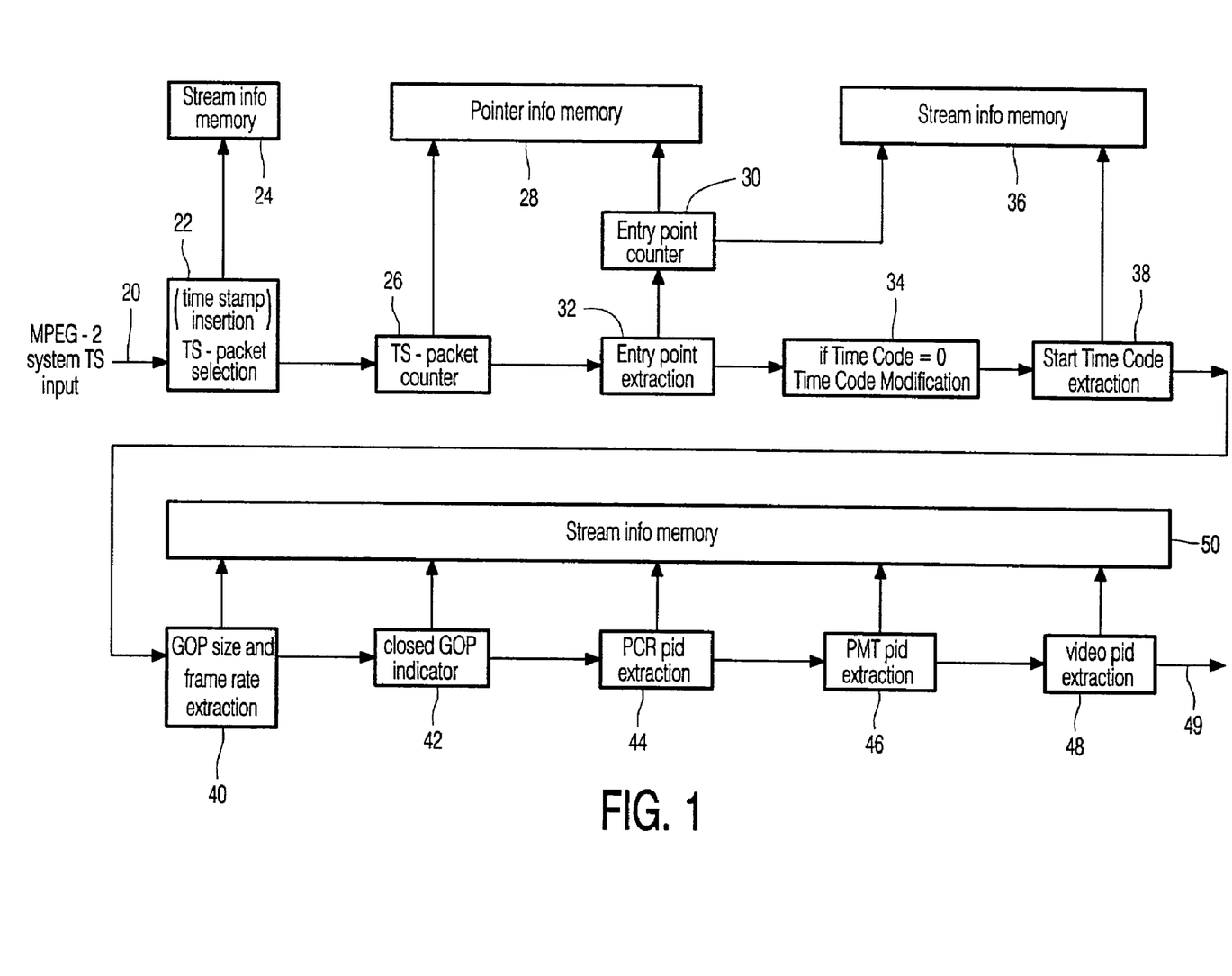
FIG. 1, a block diagram of a recording organization.

FIG. 1 is a block diagram of an exemplary recording organization. Input 20 receives a Transport Stream. In block 22, selection of the required TS packets and time stamp insertion take place, followed by storing in Stream Info Memory 24. In block 26, the selected TS packets are counted, and the count actually attained is forwarded to Pointer Info Memory 28. In block 32, entry points are extracted, and counted in block 30: the count is forwarded both to Pointer Info Memory 28 and to Stream Info Memory 36 that is in fact the same as block 24. In block 34, the Time Code is retrieved from the GOP header and if its value is zero, any necessary modification may be effected. In block 38, the Start Time Code is extracted for forwarding to the Stream Info Memory. In block 40, the GOP size and Picture Rate informations are extracted and forwarded to Stream Info Memory, now block 50. In block 42, the Closed GOP Indicator is extracted, in block 44 the PCR_PID, in block 46 the PMT_PID, and in block 48 the video PID, all for forwarding to the Stream Info Memory 50. The information on output 49 is ready for being stored. The Figure does not specify the mapping of various partial functionalities on proper hardware, which may be realized as conventional mechanisms that have not been shown for brevity.

Figure 2:
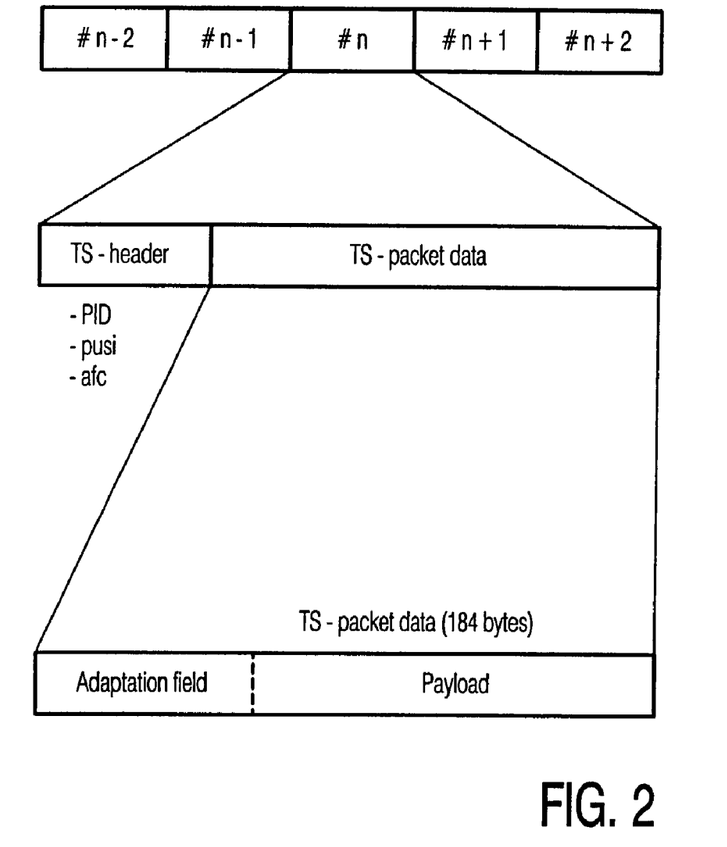
FIG. 2, a diagram of a Transport Stream structure.

FIG. 2 is a diagrammatical embodiment of the Transport Stream structure. Here, the uppermost level shows the sequence of Transport Stream Packets that each contain 188 bytes. On the next level a packet consists of a 4-Byte header that accommodates at least the informations PID, pusi and afc. The remainder is the TS-packet data. On the third level the data field may contain an adaptation field and/or a payload field that are sized according to need, and may be internally specified through the afc information.

Figure 3:
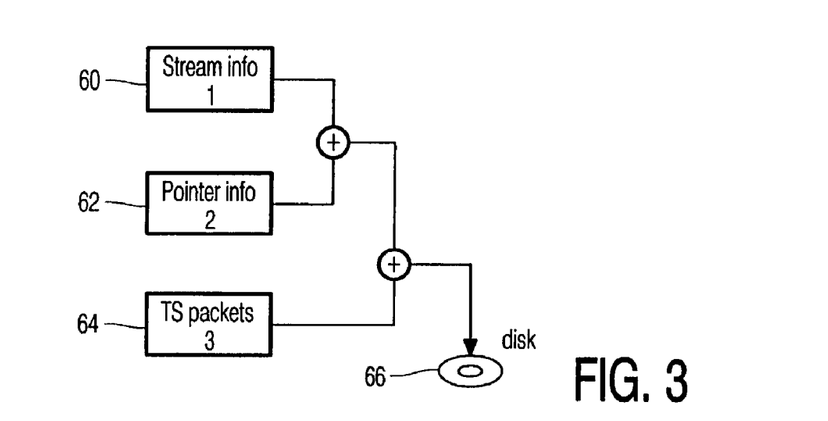
FIG. 3, a diagram of the stored data structure.

FIG. 3 is a diagram of the stored data structure. Block 64 symbolizes the stream information formed by TS packets containing all information that has been selected on the basis of the information stream received on input 22 in FIG. 1. Block 62 symbolizes the pointer information that has been produced by blocks 26, 30, 32 in FIG. 1. Block 60 symbolizes the stream information produced by the various blocks in FIG. 1, such as in particular blocks 22, 30, 38, 40, 42, 44, 46 and 48. Now, first the informations from blocks 60 and 62 are combined for contiguous storage. Next, the compound so formed, as well as the informations from block 64 are stored on the medium. The latter informations may be stored in physically distant locations from the former: the linking is through the file system. The overall information is collectively stored on disc in a format that may be configured along the exemplary teachings of FIG. 2. During a program, TS packets will be written continually. Pointer and stream informations are being written either after termination of the video take, or in relatively small-sized amounts during the video take.

Figure 4:
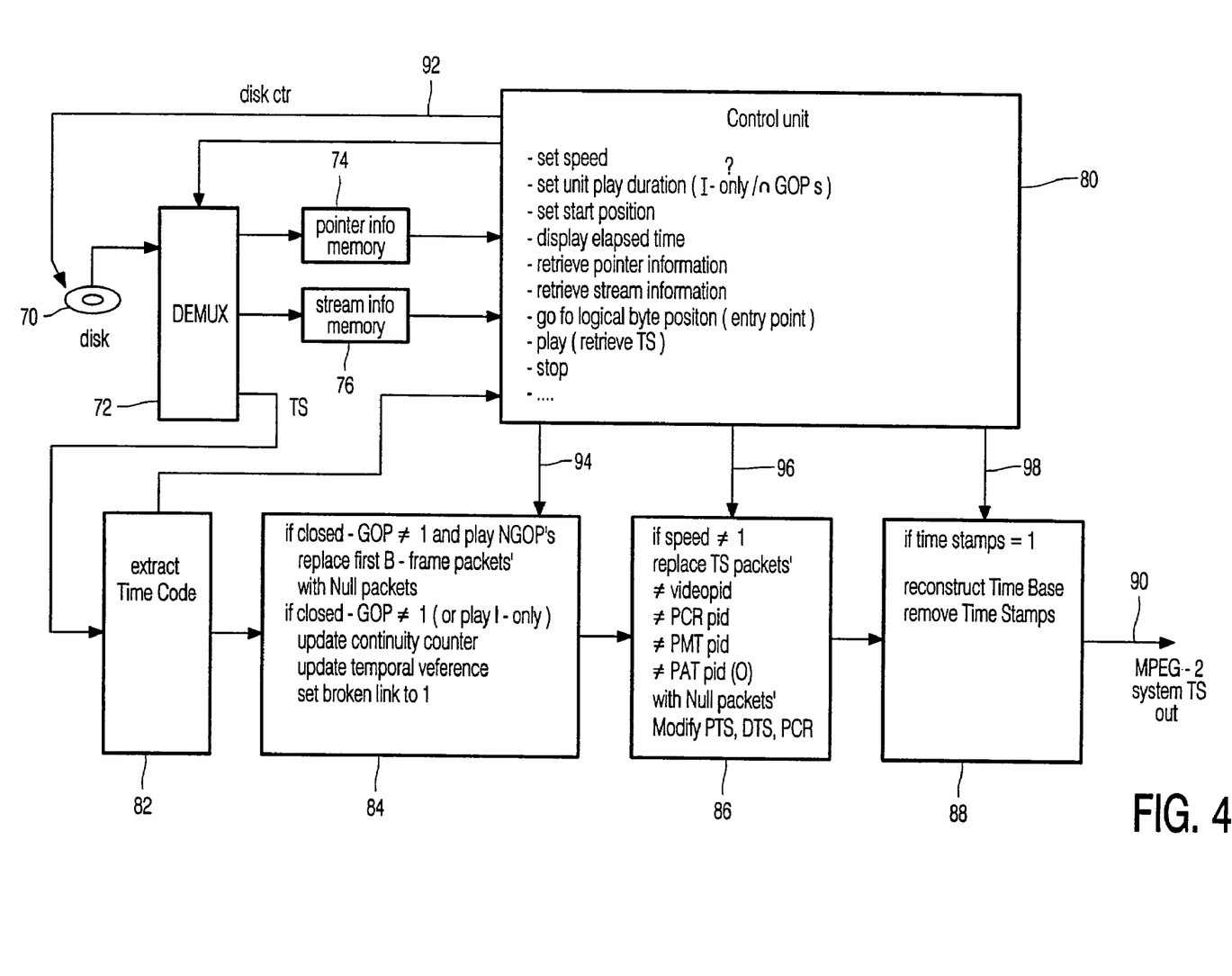
FIG. 4, a block diagram of a replaying organization.

FIG. 4 is a block diagram of an exemplary replaying organization. Item 70 represents the rewritable storage disc together with its associated electromechanical, electro-optical and electronic components for driving and information accessing, inclusive of demodulation, error correction and similar features that operate on a relatively lower organizational level than the present invention. Block 72 executes demultiplexing into three sub-streams. Block 74 symbolizes the Pointer Info Memory substream. Block 76 symbolizes the Stream Info Memory substream. These two streams are forwarded to control unit 80 that may execute the following user control functions:

setting the disc replay velocity, such as 1 . . . n times normal speed;

optionally, setting the minimum play duration before effecting a jump; here, various possibilities exist, such as play n GOPS before a jump, jump speed xn GOPs, or: play an I-picture, repeat n times, then jump to the next I-picture, etcetera;

if a plurality of programs had been stored: program select;

setting the video start position where to start playing the program in question from;

play/record;

stop;

goto a specified point in time;

fast forward & fast reverse.

Control functions are for example as follows:
display actually elapsed time from the start of the program that is being read out;
retrieving pointer and stream information from disc;
control goto operations to specific byte positions such as to access an entry point;
play as starting from a specified physical location;
record unto a specified physical location.

The control unit may forward signals so developed along control lines 92, 94, 96, 98 to various subsystems to be identified hereinafter. First, the disc-oriented subsystem 70 is controlled along line 92. The Transport Stream demultiplexed from block 72 is forwarded to block 82 for extracting of the time code. Block 84 detects whether the indicator Closed-GOP is false (≠1) and play n GOPs, replace first B-picture packets with null packets. Furthermore, block 84 detects whether the indicator Closed-GOP is false (≠1), or play I-pictures only, update continuity counter in the TS packet header, update temporal reference in picture header, and set broken link in GOP header to 1, the latter depending on the decoder type.

Block 86 detects whether replay speed ≠1, and in the positive case replaces all TS packets, except Video PID packets, PCR PID packets, PMT PID packets and PAT PID(0) packets with null packets. Furthermore, Presentation Time Stamp, Decoding Time Stamp, and PCR numbers are modified to reflect the correct presentation and decoding times.

Block 88 detects whether there are timestamps or not; in the positive case, the Time Base is reconstructed and the Time Stamps removed. Output 90 will present an amended Transport Stream according to the MPEG-2 standard. For brevity, the Figure does not specify mapping various partial functionalities on hardware.

A particular aspect of a Transport Stream is that all TS packets will start with a TS Header that contains a PID.

Figure 5:
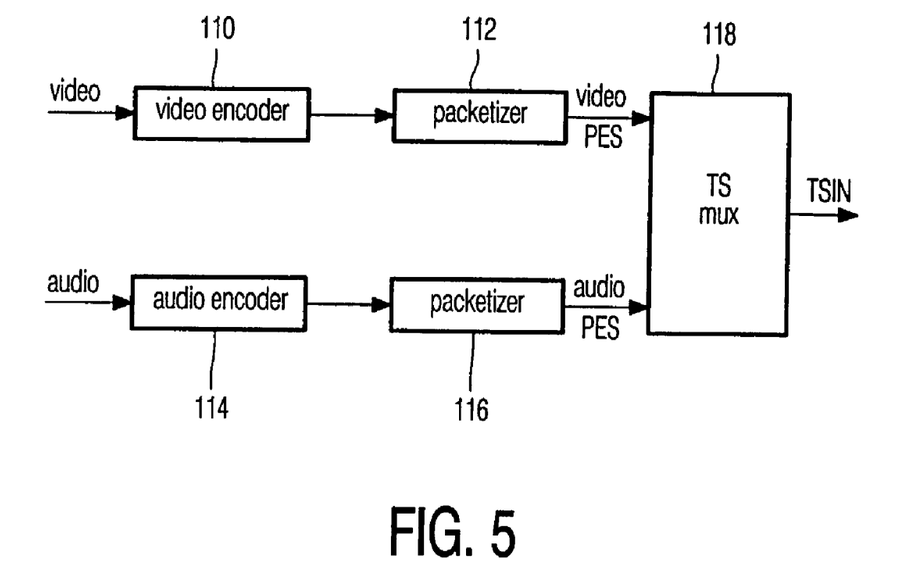
FIG. 5, packaging a Transport Stream.

FIG. 5 illustrates the packaging of a Transport Stream. At left, both video data and audio data arrive at their respective encoders 110 and 112. Both encoders then feed respective packetizers 112 and 116, respectively to produce a stream of video PES and a stream of audio PES. In multiplexer 118, the two streams are multiplexed to constitute an input Transport Stream that is ready for storage.

Figure 6:
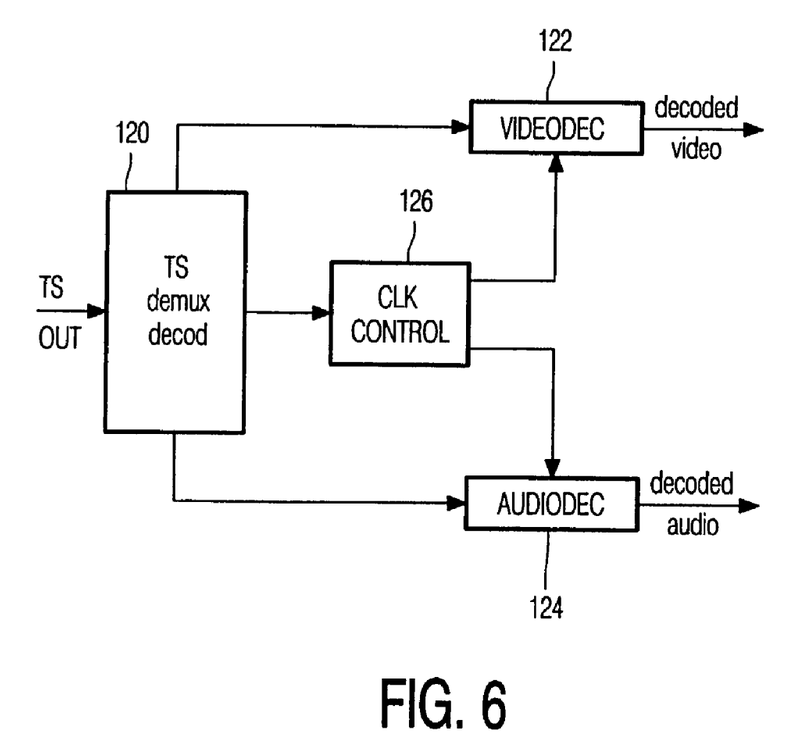
FIG. 6, unpackaging a Transport Stream.

FIG. 6 illustrates unpackaging a Transport Stream. At left, a compound Transport Stream enters a demultiplexer annex decoder 120, that will separate video from audio. Block 126 is furthermore operative for clock extraction, and synchronizes video decoder blocks 122 and audio decoder block 124. The decoded video and audio informations are then available for consumer replay.

Various relevant aspects of the invention are as follows:
The elapsed time indicator may be retrieved from the GOP-header and the Start Time Code and is independent from bitrate and GOP-size;
Fast forward and fast reverse are feasible at any speed, even if a single disc contains more programs in a physically, but not logically intermixed manner;
Both the pointer table and the TS information may be stored on an arbitrary disc location. There is some kind of Table Of Contents that for all programs contains starting locations of the TS packets/program, of the pointer tables and of the TS information tables.
Trick play requires no extra regrouping or reformatting of the picture sequences;
External as well as an internal decoders may be used;
No explicit sector argument needed for TS-packets containing an entry point;
Data need not be stored in a physically contiguous manner;
Interleaved storage of audio, video and other data is allowed;
The invention allows all GOP-sizes, even non-uniform GOP-sizes.

The invention claimed is:

1. A method of recording a video program on a medium, comprising:
storing on a medium, a digital stream of sequential packets containing video data for groups of pictures of a video program, the video data being compressed by encoding on a group of pictures basis, some of the packets being entry points where decoding of the data for playing respective portions of the video program can commence;
determining locations on the medium at which the entry points are stored, the entry point locations being determined as the digital stream is stored;
generating pointer information fon determining the locations of the entry points on the medium when subsequently playing portions of the video program from the media; and
storing the pointer information on the medium at pointer storage locations on the medium that can be aceessed using a predetermined location, to facilitate playing portions of the video program.

2. The method of claim 1 in which the video program is an audio/video program and the stream includes encoded audio data.

3. The method of claim 1 in which the stream is received and stored in real-time of the video program.

4. The method of claim 1 in which the digital stream is received containing multiple video programs and the digital stream is modified to contain fewer video programs before it is stored.

5. The method of claim 1 in which the pointer information is stored at pointer storage locations between locations where portions of sequential packets of the video stream are stored, the pointer storage locations depending on a bit rate of the stream, and the pointer storage locations are stored in a table at a predetermined location on the medium so that the table can be accessed by its predetermined location for determining the locations of pointer storage for accessing the pointer information using the pointer information stored at the pointer storage locations.

6. The method of claim 1 in which the pointer information is stored at predetermined locations on the medium so that the pointer information can be accessed by those predetermined locations.

7. The method of claim 6 in which the predetermined locations for storing the pointer information include locations between locations where portions of the sequential packets of the video stream are stored.

8. The method of claim 6 in which the predetermined locations for storing the pointer information include tables separate from locations where the sequential packets of the video stream are stored.

9. The method of claim 1 in which the recorded video stream includes data for multiple interleaved video programs and the pointer information for each video program can be identified from the pointer information of other video programs.

10. The method of claim 9 in which pointer information for multiple entry points of a video program is stored together and pointer information far each video program is stored separate from pointer information of other video programs.

11. The method of claim 1, further comprising:
deriving stream information from the video stream as the video stream is being stored;
storing the stream information with the pointer information to facilitate playing portions of the video stream.

12. The method of claim 11, wherein:
the stream information stored with the pointer information includes an indication of the number of pictures in the groups of pictures in the video stream.

13. The method of claim 11, wherein the stream information stored with the pointer information includes an indication of whether the groups of pictures are open or closed.

14. The method of claim 11, wherein the stream information stored with the pointer information includes an indication of whether the data size of groups of pictures are uniform.

15. The method of claim 14, wherein the stream information stored with the pointer information includes a frame rate to be used in combination with a uniform bit size of the groups of pictures to jump to a particular instant in time.

16. The method of claim 11, wherein the stream information stored with the pointer information includes a PID of a packet containing a program map table.

17. The method of claim 11, wherein the stream information stored with the pointer information includes a PID of a packet containing a program clock reference.

18. The method of claim 11, wherein the stream information stored with the pointer information includes a PID of a packet that contains video information.

19. The method of claim 11, wherein the stream information stored with the pointer information includes a start time code to be used to calculate elapsed time.

20. The method of claim 11, wherein the stream information stored with the pointer information includes a PID of packet containing a program clock reference.

21. A method of reproducing a video program from a medium, comprising:
reading pointer information from the medium at locations on the medium that can be accessed by location based on a predetermined location on the media;
using the pointer information to determine the locations of entry points on the medium;
reading from the medium starting at the entry points respective portions of a digital stream of sequential packets containing video data for groups of pictures of a video program, the video data being compressed by encoding on a group of pictures basis, some of the packets being entry points where decoding of the data for playing portions of the video program can commence.

22. A video recorder for recording a video program on a medium, comprising:
means for storing on a medium, a digital stream of sequential packets containing video data for groups of pictures of a video program, the video data being compressed by encoding on a group of pictures basis, some of the packets being entry points where decoding of the data for playing respective portions of the video program can commence;
means for determining locations on the medium at which the entry points are stored, the locations being determined as the digital stream is stored;
means for generating pointer information for determining the locations or the entry points on the medium when subsequently playing of respective portions of the video program; and
means for storing the pointer information on the medium at pointer storage locations on the medium that can be accessed using a predetermined location, to facilitate playing respective portions of the video program.

23. A video player for reproducing a video program from a medium, comprising:
means for reading pointer information from a medium at locations on the medium that can be accessed by location using a predetermined location on the media;
using the pointer information to determine the locations of entry points on the medium;
reading from the medium starting at the entry points, portions of a digital stream of sequential packets containing video data for groups of pictures of a video program, the video data being compressed by encoding on a group of pictures basis, some of the packets being entry points where decoding of the data for playing the pictures can commence.

24. A medium, comprising:
a digital stream of packets containing video data for groups of pictures of a video program, the video data being compressed by encoding on a group of pictures basis, some of the packets being entry points where decoding of the data for playing respective portions of the video program can commence; and
pointer information stored at pointer storage locations on the medium, the pointer information being accessible by location using a predetermined location, the pointer information being usable for determining the locations that entry points are stored on the medium when the video program is played from the medium.

25. The recorder of claim 22 in which
the video program is an audio/video program and the stream includes audio data;
the digital stream is received and stored in real-time of the video program;
the digital stream is received containing multiple video programs and the digital stream is modified to contain fewer video programs before it is stored;
pointer information is stored at pointer storage locations between locations where portions of sequential packets of the video stream are stored;
the pointer storage locations include locations depending on a bit rate of the stream, and these pointer storage locations are stored in a table at a predetermined location on the medium so that the table can be accessed by its predetermined location for determining the locations of the pointer storage for accessing the pointer information using the locations of the pointer information;
the pointer storage locations include predetermined locations on the medium so that the pointer information can be accessed by those predetermined locations;
the predetermined locations for storing the pointer information include locations between locations where portions of the sequential packets of the video stream are stored;
the predetermined locations for storing the pointer information include tables separate from locations where the sequential packets of the video stream are stored;
the recorded video stream includes data for multiple interleaved video programs and the pointer information for each video program can be identified from the pointer information of other video programs;
pointer information for multiple entry points of a video program is stored together and pointer information for each video program is stored separate from pointer information of other video programs;

the recorder further comprising: means for deriving stream information from the video stream as the video stream is being stored; and the storing means stores the stream information with the pointer information to facilitate playing portions of the video stream;

the stream information stored with the pointer information includes an indication of the number of pictures in due groups of pictures in the video stream;

the stream information stored with the pointer information includes an indication of whether the groups of pictures are open or closed;

the stream information stored with the pointer information includes an indication of whether the data size of the groups of pictures are uniform;

the stream information stored with the pointer information includes a frame rate to be used in combination with a uniform bit size of the groups of pictures to jump to a particular instant in time;

the stream information stored with the pointer information includes a PID of a packet containing a program map table;

the stream information stored with the pointer information includes a PID of a packet containing a program clock reference; the stream information stored with the pointer information includes a PID of a packet that contains video information;

the stream information stored with the pointer information includes a start time code to be used to calculate elapsed time;

the stream information stored with the pointer information includes a PID of a pocket containing a program clock reference.

\* \* \* \* \*